(12) United States Patent
Wilhelm Bakermans

(10) Patent No.: US 6,345,567 B1
(45) Date of Patent: Feb. 12, 2002

(54) POWER ENHANCING UNIT FOR A LINEAR POWER MODULE

(75) Inventor: Johannes Cornelis Wilhelm Bakermans, Harrisburg, PA (US)

(73) Assignee: The Whitaker Corporation, Wilmington, DE (US)

(*) Notice: Subject to any disclaimer, the term of this patent is extended or adjusted under 35 U.S.C. 154(b) by 0 days.

(21) Appl. No.: 09/168,401

(22) Filed: Oct. 6, 1998

(51) Int. Cl.[7] .............................. F16J 11/14; F16H 21/44
(52) U.S. Cl. ............................... 92/129; 92/140; 74/110
(58) Field of Search ............................ 74/110; 92/129, 92/140

(56) References Cited

U.S. PATENT DOCUMENTS

| | | | | |
|---|---|---|---|---|
| 2,829,500 A | * | 4/1958 | Butler | 74/110 |
| 2,897,784 A | * | 8/1959 | Harper | 269/228 |
| 3,400,924 A | * | 9/1968 | Arnold et al. | 269/228 |
| 3,807,721 A | * | 4/1974 | Arnold | 269/228 |
| 3,941,362 A | * | 3/1976 | Arnold et al. | 269/32 |

* cited by examiner

*Primary Examiner*—F. Daniel Lopez

(57) ABSTRACT

A power enhancing unit (50) is disposed between a linear power unit (12) and an industrial tool (10) that is operated by the power unit. The power enhancing unit (50) includes an input member (160) coupled to a power ram (26) of the power unit and upon application of a primary force from the power ram undergoes movement from a first position (232) to a second position (242). An output member (106) is coupled to the tool ram (94) and a power enhancing mechanism (166) is coupled to both the input member (160) and the output member (106) and arranged so that upon movement of the input member the output member undergoes movement and exerts a secondary force on the tool ram (94) that is greater than the primary force for a portion of the movement of the output member.

11 Claims, 7 Drawing Sheets

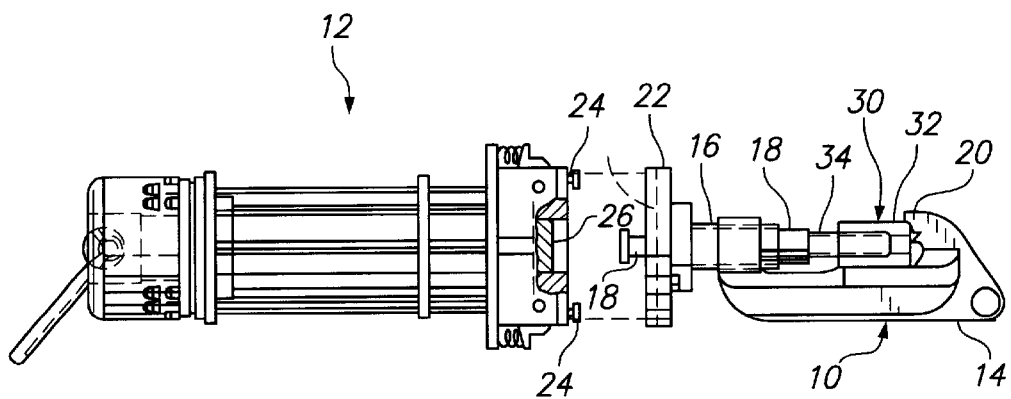
FIG. 1 *(PRIOR ART)*
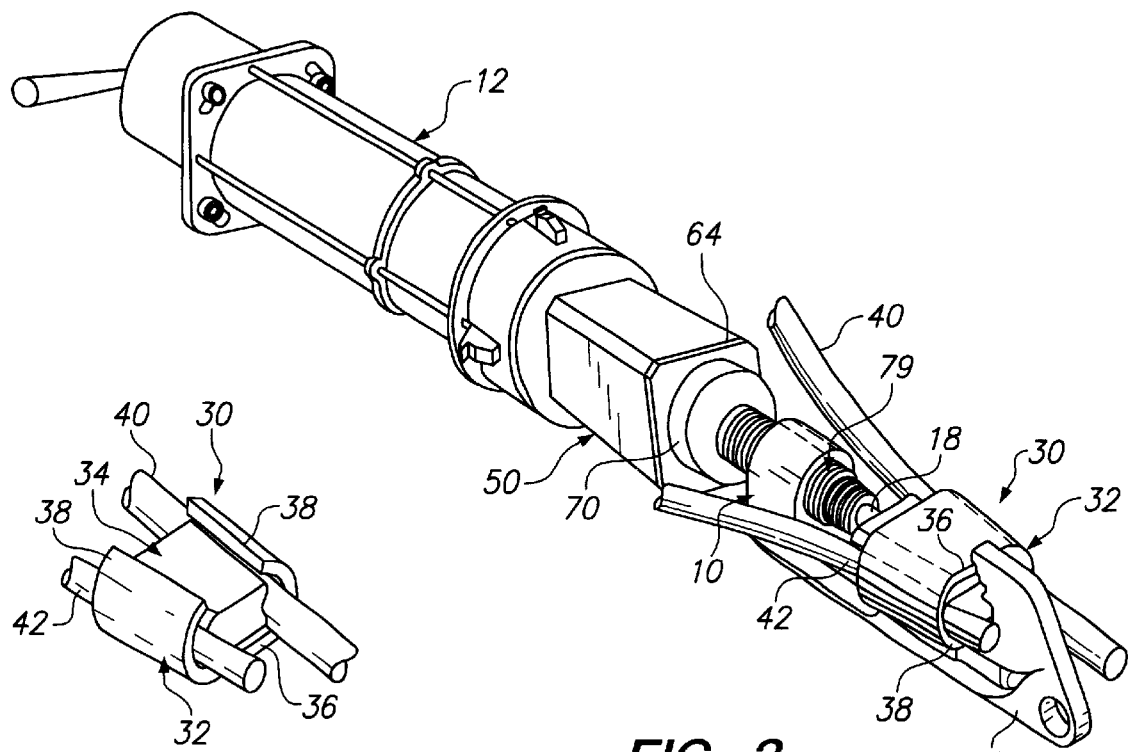
FIG. 2
FIG. 3

POWER ENHANCING UNIT FOR A LINEAR POWER MODULE

The present invention relates to linear power modules for actuating industrial tools and more particularly to a unit for increasing the power output of the module during a selected portion of its operating cycle.

BACKGROUND OF THE INVENTION

Linear power modules typically have a power ram that is made to undergo reciprocating motion and that is connectable to the ram of an industrial tool for imparting linear motion to the tool ram in the operation of the tool. The linear power module includes a mechanism to effect the movement of the power ram. This mechanism usually takes the form of an air cylinder, a hydraulic cylinder, a spring mechanism, an explosive device, or an electromagnet apparatus. Industrial tools that require a very fast moving power ram, such as electrical terminal crimping tools, are generally limited to the use of explosive devices or spring mechanisms. These mechanisms, however, have the characteristic of relatively high power during the first part of the stroke of the power ram and a diminished amount of power as the stroke proceeds to its limit. Most industrial tool, such as terminal crimping tools, especially those having a linearly moving tool ram, require increased power during the last portion of the stroke. Therefore, the minimum power output of a linear power module determines its usefulness with respect to these industrial tools. An example of a linear power module and associated industrial tool having a linearly moving tool ram is shown in FIG. 1, and is the subject of copending patent application Ser. No. 08/xxxxxx, filed July xx, 1998, and is assigned to the present assignee. As seen in FIG. 1, an industrial terminal crimping tool 10 is positioned to be coupled to a linear power module 12. The tool 10 includes a frame 14 and a threaded portion 16 that is threaded into a hole in the frame. A tool ram 18 is slidable within a longitudinal hole in the threaded portion 16 toward an anvil 20. The threaded portion 16 is rigidly attached to a mounting flange 22 which removably attaches to the power module 12 via attachment bolts 24 in the usual manner. The power module 12 includes a compressible spring unit, not shown, that when compressed and then actuated, moves a power ram 26 that engages the tool ram 18 for operating the tool 10. A typical wire connector 30 is shown in FIG. 2 in a typical application. As shown, the wire connector 30 includes a C-shaped clamping member 32 and a wedge 34. The clamping member 32 has a web 36 and two oppositely formed rolled edges 38 that diverge from left to right, as viewed in FIG. 2. The rolled edges 38 form opposing channels for receiving a power cable 40, or wire, and a tap wire 42 with the wedge 34 therebetween. The wedge has opposite edges that diverge similarly to the rolled edges 38 and are concave to better seat the cylindrical shaped power cable 40 and tap wire 42. When installing the wire connector, the clamping member 32 is placed with one rolled edge over the power cable and the tap wire 42 in the opposite channel. The wedge 34 is then inserted into the larger end of the clamping member and forced into tight engagement with the cable 40, tap wire 42, and clamping member 32 and the assembly is then inserted into the tool 10 so that the edge of the clamping member 36 is against the anvil 20, as shown in FIG. 1, and the end of the wedge 34 is against the end of the tool ram 18. The tool 10 is then coupled to the power module 12 which is then actuated to drive the wedge 34 into full engagement with the clamping member to electrically interconnect the tap wire 42 to the cable 40 and produce the wire connection shown in FIG. 2.

It will be appreciated that the force, derived from the compressed spring unit, that the power ram exerts on the tool ram toward the end of its stroke is greatly reduced with respect to the force available at the beginning of its stroke. Therefore, the linear power module must be overly robust to be effective in operating the industrial tool. This, of course requires that the linear power module be made stronger and necessarily heavier to accommodate the additional stresses, making the device more cumbersome and less convenient to use as a portable unit.

What is needed is a linear power module having a power enhancing unit that is disposed between the power module and the industrial tool that provides a mechanical advantage so that the power ram exerts a diminished force on the tool ram in the beginning of its stroke and a greater force toward the end of the stroke when the increased force is most needed.

SUMMARY OF THE INVENTION

A linear power module for actuating a tool ram of an industrial tool includes a power ram arranged to undergo motion along a power axis. A power enhancing unit is disposed between the power unit and the industrial tool. The power enhancing unit includes a frame and an input member coupled to the power ram and arranged to undergo movement within the frame from a first position to a second position. The power ram is operable to exert a primary force on the input member to effect this movement. An output member is coupled to the tool ram and a power enhancing mechanism is coupled to both the input member and the output member and arranged so that upon movement of the input member the output member undergoes movement and exerts a secondary force on the tool ram that is greater than the primary force for a portion of the movement of the output member. The tool ram has a tool axis that is coaxial with the power axis.

An embodiment of the invention will now be described by way of example with reference to the following drawings.

DESCRIPTION OF THE FIGURES

FIG. 1 is front view of a prior art linear power module and industrial tool;

FIG. 2 is an isometric view of a wire connector of the type that is assembled by the tool shown in FIG. 1;

FIG. 3 is an isometric view of a linear power module and industrial tool with a power enhancing unit incorporating the teachings of the present invention;

DESCRIPTION OF AN EMBODIMENT OF THE INVENTION

Figure 4:
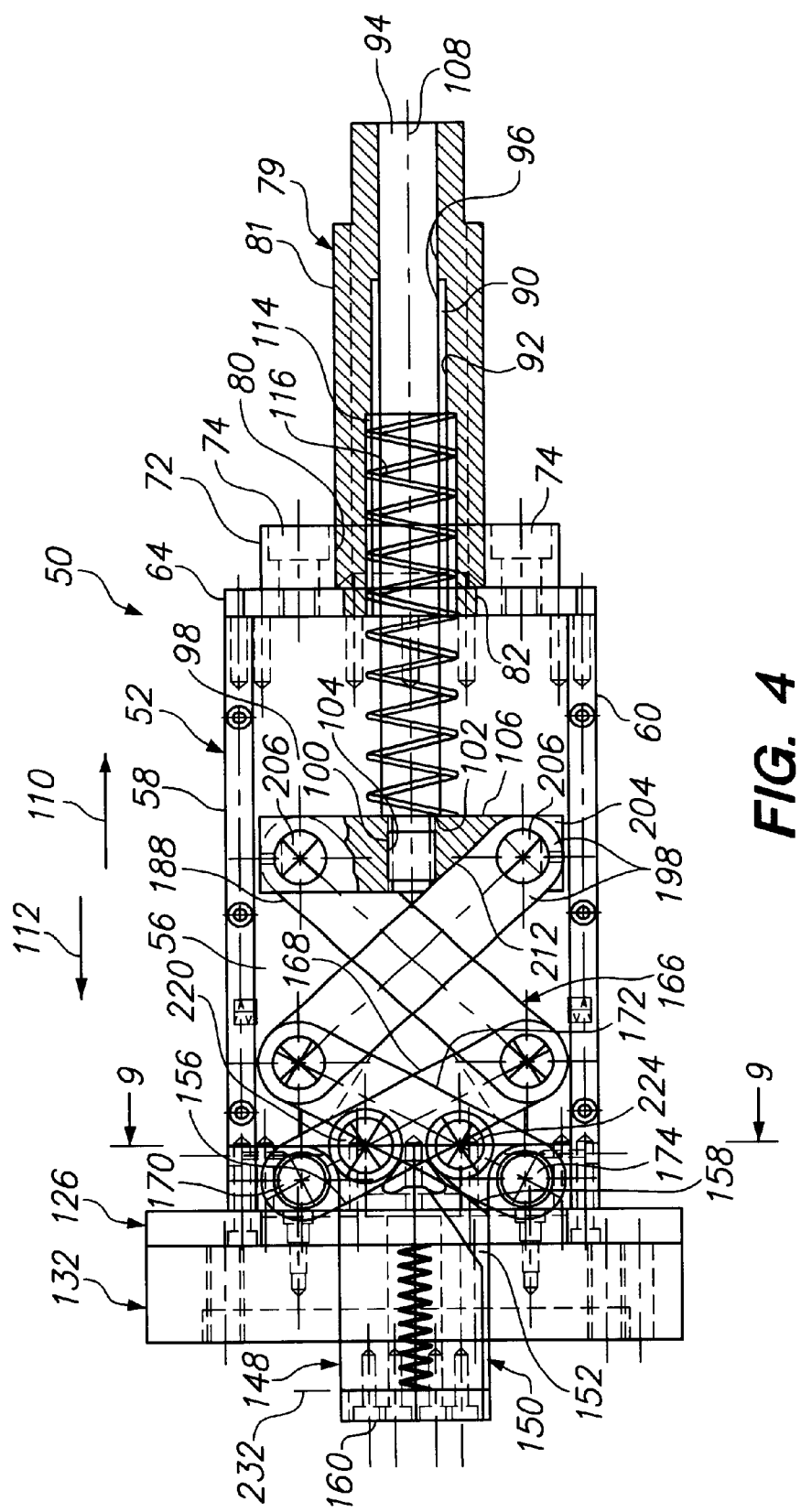
FIG. 4 is a cross-sectional view of the power enhancing unit taken from the side as viewed in FIG. 3.
Figure 5:
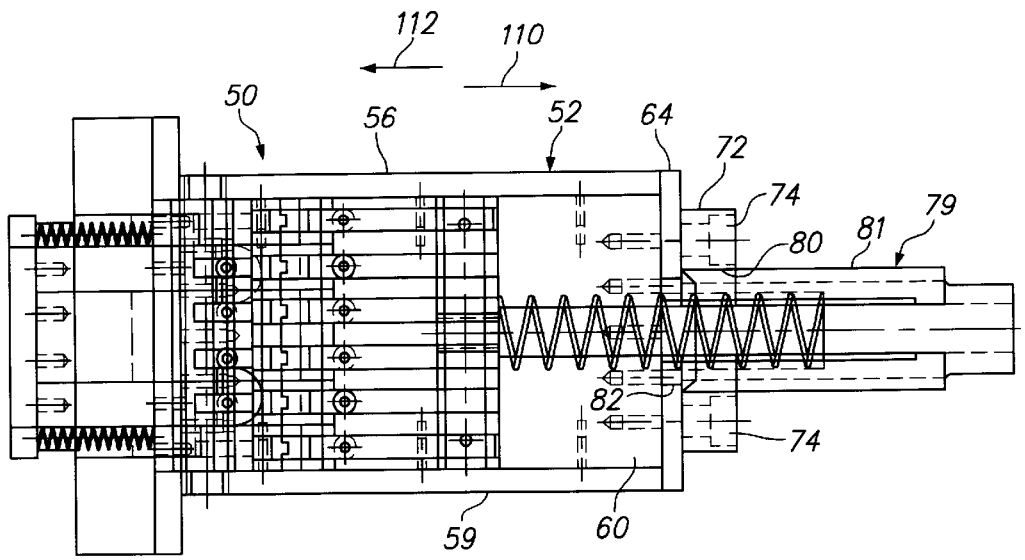
FIG. 5 is a cross-sectional view of the power enhancing unit taken from the top as viewed in FIG. 3.
Figure 6:
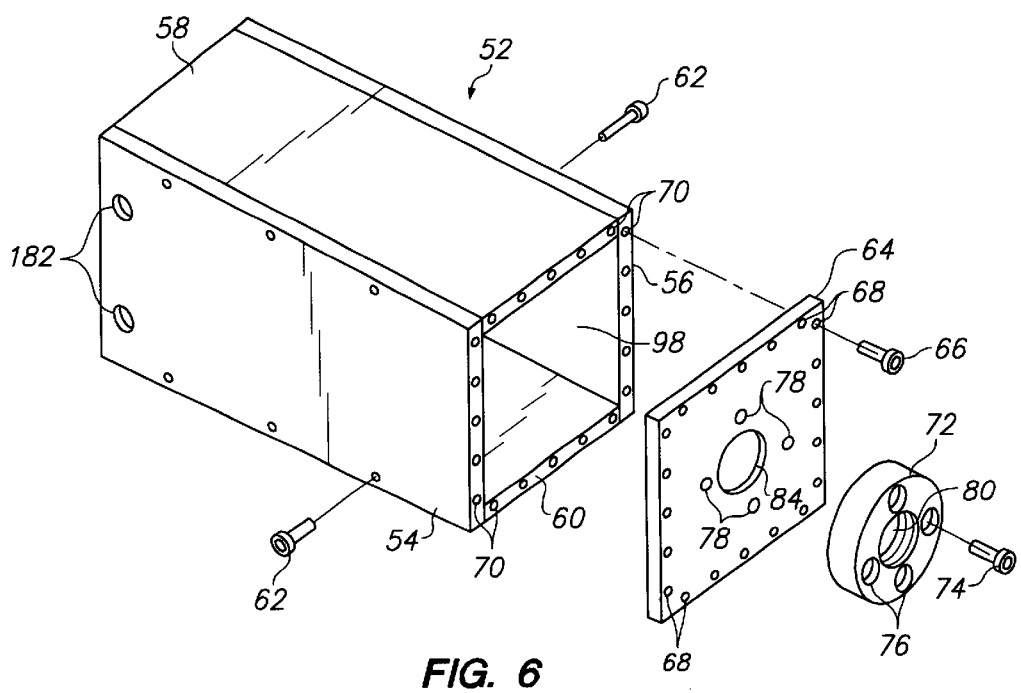
FIG. 6 is a partial exploded parts view of the outer case of the power enhancing unit shown in FIG. 3.

There is shown in FIG. 3 a linear power module 12 and industrial crimping tool 10, similar to those shown in FIG. 1. A power enhancing unit 50 is coupled to both the linear power module and the industrial tool so that movement of the power ram 26 in one direction results in a corresponding movement in the same direction of the tool ram 18 for effecting the crimping operation of the wire connector shown in FIG. 2. The power enhancing unit 50, as shown in FIGS. 4, 5, and 6, includes a frame 52 having a rectangular box structure with left and right side plates 54 and 56, respectively, which are attached to upper and lower plates 58 and 60, respectively, by means of screws 62. The screws 62 extend through clearance holes in the side plates and into threaded holes in the upper and lower plates, as shown. The frame 52 includes a mounting plate 64 which is attached to the edges of the side and upper and lower plates by means of screws 66 that extend through clearance holes 68 in the mounting plate and into threaded holes 70 in the edges of the other plates. A collar 72 is secured to the mounting plate 64 by means of screws 74 that extend through clearance holes 76 and into threaded holes 78 in the mounting plate. The threaded portion 16 of the industrial crimping tool 10 is replaced with an attachment member 79 having a threaded outside diameter 81 that mates with a threaded bore 80 formed through the collar 72 and includes a reduced diameter end 82 that is a press fit with a hole 84 formed through the mounting plate 64 concentric with the bore 80. Note that, once assembled, the attachment member 79 is intended to be a permanent part of the power enhancing unit 50. The frame 12 of the tool 10 is then operationally coupled to the power enhancing unit by screwing the threaded diameter 81 into the threaded hole in the tool frame. As best seen in FIGS. 4 and 5, the attachment member 79 includes a sleeve or bushing 90 that is pressed into a bore 92 formed longitudinally through a portion of the attachment member concentric with its outer diameter 81. The tool ram 18 of the prior art industrial tool shown in FIG. 1 is replaced with a tool ram 94. The tool ram 94 extends through and is a lose slip fit with a bore 96 formed through both the sleeve 90 and the right most portion of the attachment member 79, as shown in FIG. 4. The left most end of the tool ram 94 extends into the interior 98 of the frame 52 and terminates in a reduced threaded diameter 100 and shoulder 102. The diameter 100 is threaded into a hole 104 in an output member 106 so that the shoulder 102 is tight against the surface of the output member. The output member is arranged to slide freely within the interior 98 of the frame 52 along a longitudinal axis 108 in first and second directions 110 and 112, respectively, indicated by arrows in FIGS. 4 and 5. A counterbore 114 is formed in the attachment member 79 concentric with the bore 92 to provide clearance for a compression spring 116. The compression spring is arranged about the sleeve 90 and extends from the bottom of the counterbore 114 into the interior 98, and against the output member 106 for urging the output member and the attached tool ram 94 in the second direction 112.

A locating mounting plate 126 is secured to the frame 52 by means of screws 128 that extend through four rows of counterbored clearance holes 130 in the locating mounting plate and into threaded holes, not shown, in the edges of the plates 54, 56, 58, and 60 opposite the mounting plate 64. A cam guide plate 132 is attached to the locating mounting plate 126 by means of screws 134 that extend through counterbored holes 136 and into threaded holes 138 in the cam guide plate. Upper and lower toggle link pivot blocks 140 and 142, respectively, are of rectangular shape and are snugly received in guide openings 144 and 146 formed in the locating mounting plate 126. The pivot blocks 140 and 142 are secured in place by means of screws 144 that extend through clearance holes 146 in the cam guide plate 132 and into threaded holes, not shown, formed in the two pivot blocks so that the pivot blocks are pulled tightly against the surface of the cam guide plate. Upper and lower cam members 148 and 150 are slidingly received in an offset opening 152 in the cam guide plate 132 that is in alignment with a similar opening 154 in the locating mounting plate 126 so that the cam members are free to slide back and forth within these openings in the first and second directions 110 and 112, as will be explained in more detail below. The upper and lower cam members 148 and 150 have angled camming surfaces 156 and 158 and are secured in their offset positions by being attached to an input member 160 by means of screws 162 that extend through counterbored holes 164 formed through the input member and into threaded holes, not shown, in the upper and lower cam members. When the power enhancement unit 50 is coupled to the linear power module 12, as shown in FIG. 3, the input member 160 abuts against the end of the power ram 26 so that, upon actuation of the power module 12, the power ram causes the input member 160 and attached cam members 148 and 150 to move in the first direction 110.

Figure 7:
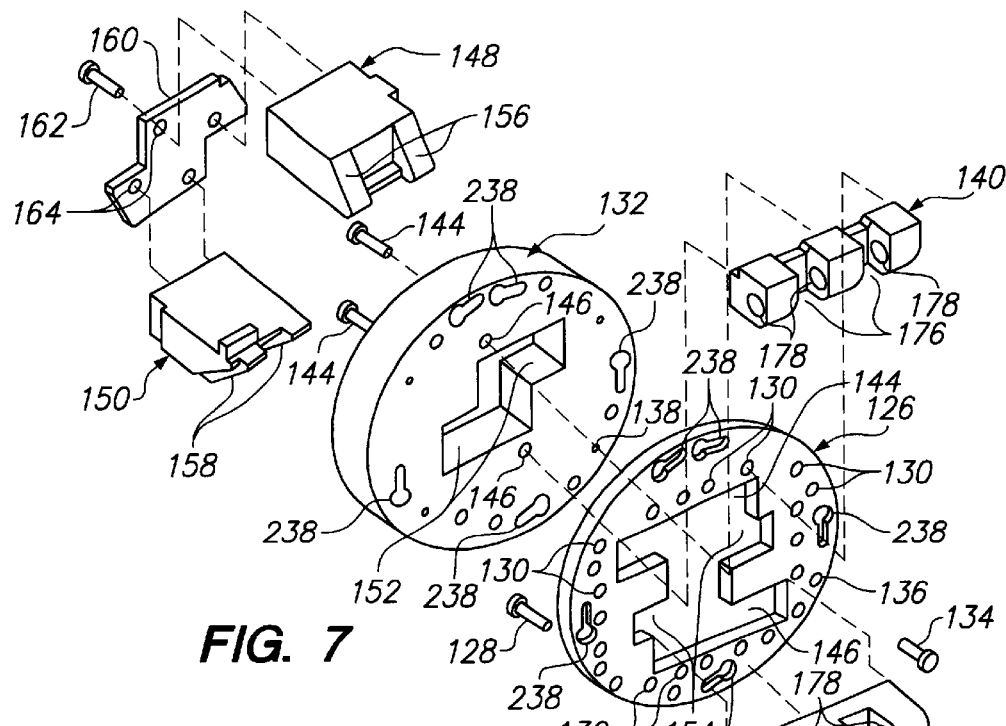
FIG. 7 is an exploded parts view of the cam and guide plates that attach to the outer case shown in FIG. 6.
Figure 9:
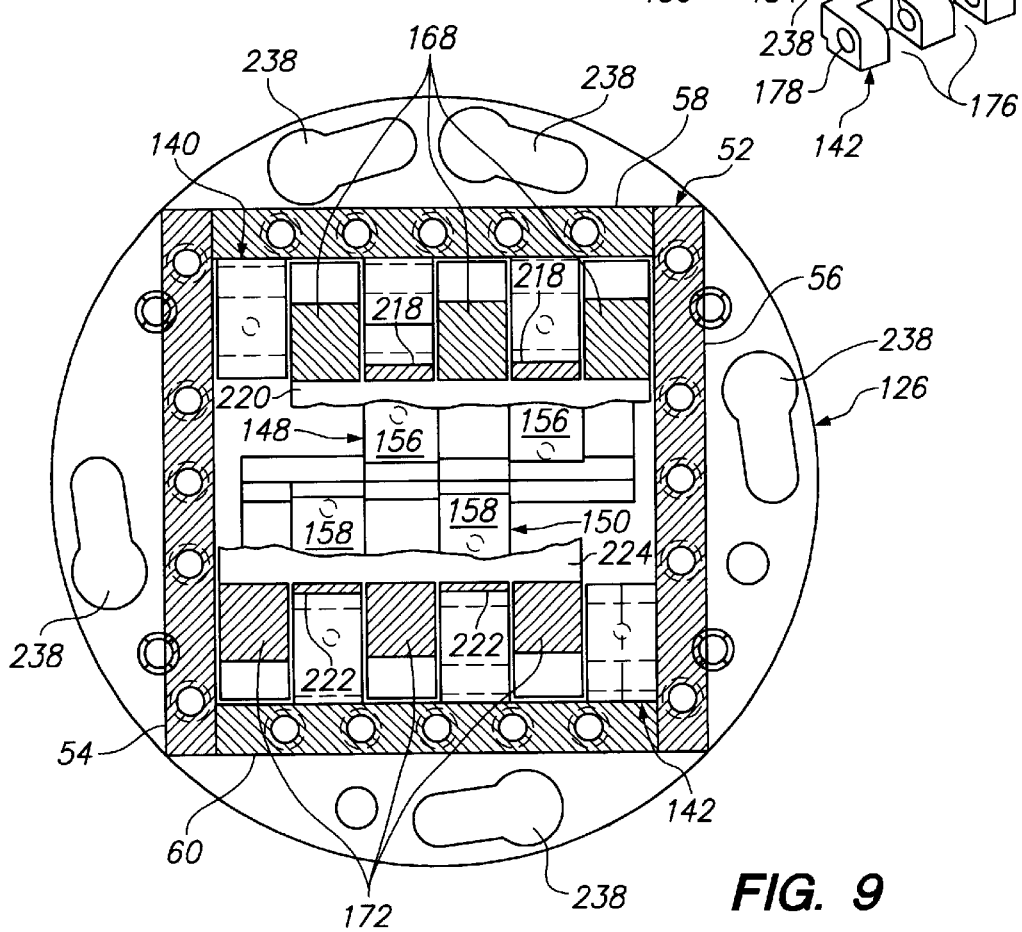
FIG. 9 is a cross-sectional view taken along the lines 9—9 in FIG. 4.
Figure 8:
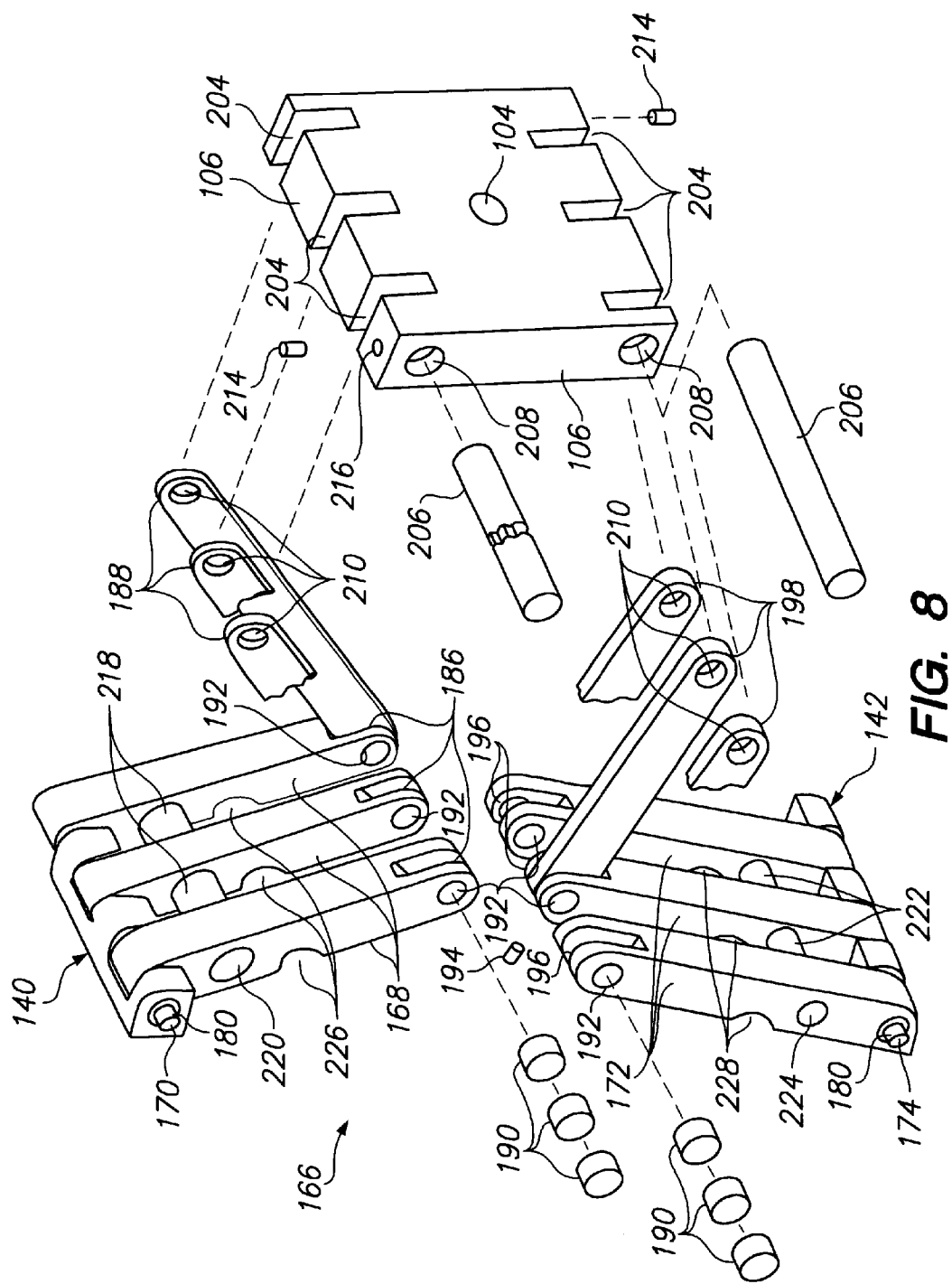
FIG. 8 is an isometric view of the upper and lower toggle links of the power enhancing unit shown spaced apart for clarity.
Figure 10:
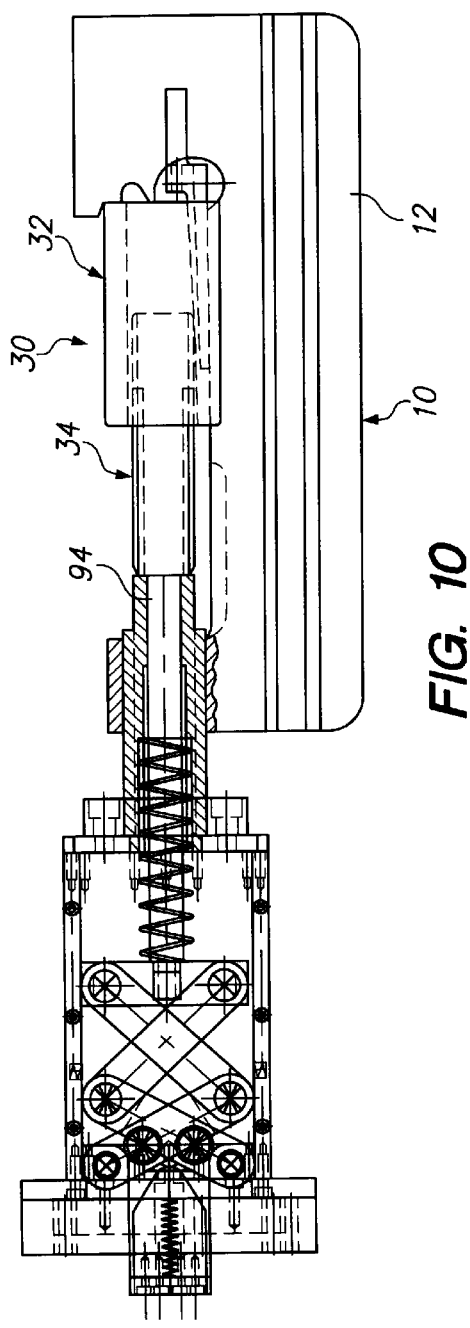
FIGS. 10 and 11 are partial cross-sectional views of the power enhancing unit, similar to that of FIG. 4, and industrial tool showing the toggle mechanism of the unit in different operational positions.
Figure 11:
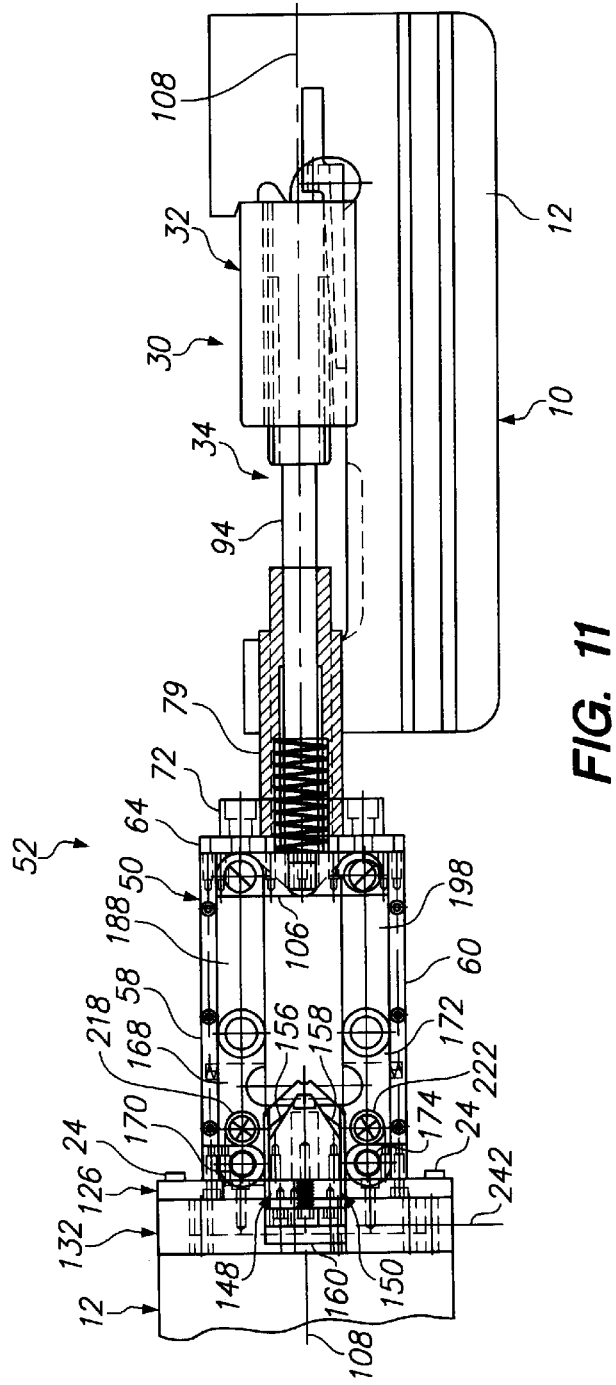

The power enhancement unit 50 includes a toggle linkage mechanism 166 having three upper primary links 168 pivotally attached to the upper toggle link pivot block 140 by means of an upper pivot pin 170, and three oppositely arranged lower primary links 172 pivotally attached to the lower toggle link pivot block 142 by means of a lower pivot pin 174. These upper and lower oppositely arranged primary links are shown in FIG. 8 spaced apart for clarity, however, as best seen in FIG. 4, the upper and lower primary links are actually interleaved. As shown in FIG. 7, the upper and lower toggle link pivot blocks 140 and 142 include cutouts 176 for closely receiving the ends of two of the upper primary links and two of the lower primary links, respectively. The third upper and lower primary links are received on the ends of their respective pivot blocks as shown in FIG. 8. The pivot pins 170 and 174 extend through slip fit holes 178 in the pivot blocks 140 and 142 and corresponding slip fit holes, not shown, in the links 168 and 172. Each end of the pivot pins has a reduced diameter 180 that is a slip fit with and extends into a respective hole 182 formed through the left and right side plates 54 and 56, as best seen in FIG. 6. The shoulders formed by the reduced diameters abut against the inside walls of the side plates thereby preventing axial movement of the pivot pins. Each upper primary link 168 includes a cutout 186 for closely receiving an end of a respective upper secondary link 188 that is pivotally attached thereto by means of a short pivot pin 190. The short pivot pins extend through slip fit holes 192 that are formed through both the upper primary and secondary links and are secured in place by means of set screws 194 that are received in threaded holes, not shown, in the upper secondary links that intersect the holes 192. Similarly, each lower primary link 172 includes a cutout 196 for closely receiving an end of a respective lower secondary link 198 that is pivotally attached thereto by means of a short pivot pin 190. The lower secondary links 198 are oppositely arranged with respect to, but interleaved with, the upper secondary links 188. The short pivot pins extend through slip fit holes 192 that are formed through both the lower primary and secondary links and are secured in place by means of set screws 194 that are received in threaded holes, not shown, in the lower secondary links that intersect the holes 192. The right most ends of the upper and lower secondary links 188 and 198 are received in openings 204 formed in the output member 106, as best seen in FIGS. 4 and 8. The secondary links are pivotally attached to the output member 106 by means of pivot pins 206 that extend through slip fit holes 208 formed through the output member and slip fit holes 210 formed through the ends of the links 188 and 198. The openings 204 include surfaces 212 that are angled inwardly to provide clearance for the secondary links when in their retracted position shown in FIG. 4. Each of the pivot pins is held in place by means of a set screw 214 that is threaded into a hole 216 in the output member 106 and tightened against the pivot pin. Two upper cam follower rollers 218 are arranged between adjacent upper primary links 168, as best seen in FIG. 8, and held in place by means of a pin 220 that extends through holes in the upper primary links, the rollers 218 being rotatable on the pin 220. Similarly, two lower cam follower rollers 222 are arranged between adjacent lower primary links 172 and held in place by means of a pin 224 that extends through holes in the lower primary links, the rollers 222 being rotatable on the pin. Each of the upper primary links 168 has a cutout 226 for receiving the cam follower rollers 222 and each of the lower primary links 172 has a cutout 228 for receiving, with clearance, the cam follower rollers 218, when the primary and secondary links 168, 172, 188, and 198 are in their retracted position shown in FIG. 4.

The operation of the power enhancing unit 50 will now be described with reference to FIGS. 4, 9, 10, and 11. To begin, the toggle linkage mechanism 166 is in its retracted position as shown in FIG. 4 where the cams 148 and 150 are in their first positions, indicated at 232 in FIG. 4, and the camming surfaces 156 and 158 are in engagement with respective cam follower rollers 218 and 222. At this point the attachment member 79 is manually screwed into the threaded hole in the tool frame 12 of the industrial crimping tool 10 while a partially assembled wire connector 30, cable 40, and wire tap 42 are manually held in position within the tool, in the usual manner. The attachment member 79 is screwed into the tool frame so that its end or the end of the tool ram 94 engages the left most end of the wedge 34 and begins to force the wedge further into the C-shaped clamping member 32, thereby removing most of the play between the parts of the wire connector and the cable and tap wire. The power enhancing unit 50 and industrial tool 10 are now in the position shown in FIG. 10 with the longitudinal axis 108 of the power enhancing unit 50 in coincidence with the longitudinal axis of the tool. If not already done, the linear power module is operated to retract its power ram, compress its internal compressible power unit, and latch the mechanism in place. The linear power module 12 is then coupled to the power enhancing unit 50 by inserting the heads of bolts 24 extending outwardly from the module 12, similar to that shown in FIG. 1, into keyhole-shaped openings 238 formed through the locating mounting plate 126 and the cam guide plate 132 and one of the units rotated so that the heads of the bolts are aligned over the smaller portions of the keyholes thereby securing the two units together. In this position the power ram 26 is in abutting engagement with the input member 160 and the axis of movement of the power ram, or power axis, coincides with the longitudinal axis 108 of the power enhancing unit 50 and the axis of the attached tool 10. The latch of the linear power module is then tripped in the usual manner so that the compressible power unit causes the power ram 26 to move in the first direction 110, and correspondingly moving the input member 160 and attached upper and lower cam members 148 and 150 in the first direction. As the input member and attached upper and lower cam members move in the first direction the camming surfaces 156 and 158 interact with respective cam follower rollers 218 and 222 to cause the upper primary links 168 to pivot counterclockwise and the lower primary links 172 to pivot clockwise. As this movement occurs the pairs of upper primary and secondary links begin to straighten, as do the pairs of lower primary and secondary links. This straightening of the pairs of primary and secondary links causes the output member 106 to move in the first direction 110. As the power ram 26 completes its stroke moving to its full right position, the input member 160 and attached upper and lower cam members 148 and 150 have also moved to their full right or second position 248, shown in FIG. 11. In this position, the pairs of primary and secondary links 168, 188, and 172, 198 are substantially straight, the output member 106 has moved to its full right position, and the tool ram 94 has also moved to its full right position thereby inserting the wedge 34 fully into engagement with the C-shaped member and the cable 40 and wire tap 42. The linear power module 12 is then separated from the power enhancing unit 50 and the compression spring 116 in the unit 50 urges the output member 106 in the second direction 112 until the toggle link mechanism 166 and the cam members 148 and 150 reach their starting positions as shown in FIG. 4.

Figure 12:
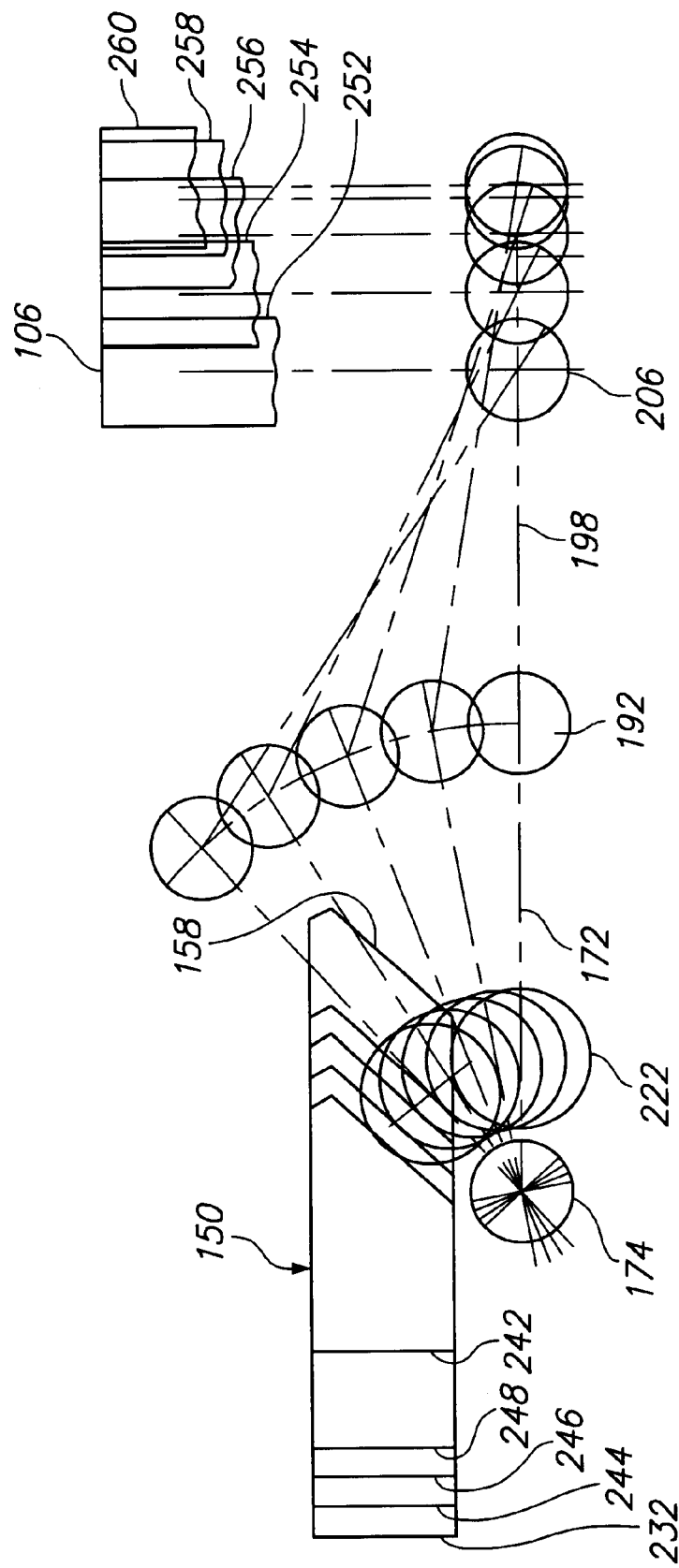
FIG. 12 is a schematic representation of a portion of the toggle linkage mechanism.

The above described movement of the input member 160 from the first position 232 to the second position 242 and the corresponding movement of the output member 106 and example forces related to each are illustrated in FIG. 12. FIG. 12 is a schematic representation of the lower cam member 150, lower primary links 172, lower secondary links 198, and the output member 106, showing various positions of the mechanism as the cam member is advanced from the first position 232 to the second position 242. In the interest of simplicity, only the lower components are shown and their operation described below. It will be understood that the upper components will simultaneously operate in a similar manner. When the latch of the linear power module 12 is tripped to start the crimping cycle the power ram 26 exerts a primary force against the input member 160 and attached cam member 150 causing the cam member to move in the first direction 110. The movement of the cam member 150, while being one continuous motion from the first position 232 to the second position 242, is shown in several discrete movements for illustrative purposes, in FIG. 12. The cam member 150 moves from the first position 232, 0.113 inch to a first intermediate position 244, 0.226 inch to a second intermediate position 246, 0.339 inch to a third intermediate position 248, and then 0.716 to the final and second position 242, all measurements being taken from the first position. Concurrently, the output member 106 moves, exerting a secondary force on the tool ram 94, from a first output position 252 to succeeding second, third, fourth, and fifth output positions 254, 256, 258, and 260, respectively, in correspondence to the movement of the cam member 150. The displacement of these movements of the output member 106, taken from the first output position 252, are 0.307 inch, 0.538 inch, 0.680 inch, and 0.728 inch, respectively. When the cam member 150 is in its first position 232 and the output member in the position 252, as illustrated in FIG. 12 a primary force of about 9000 pounds is exerted on the cam member and a secondary force of about 8000 pounds is transferred to the output member 106 which, transferees this force to the wedge 34 of the wire connector 30 through the tool ram 94. When the cam member 150 reaches the first intermediate position 244 the primary force exerted on the cam member is about 7,460 pounds and the corresponding secondary force on the output member 106 at the position 254 is about 8,400 pounds. When the cam member 150 reaches the second intermediate position 246 the primary force exerted on the cam member is about 6,100 pounds and the corresponding secondary force on the output member 106 at the position 256 is about 9,900 pounds. When the cam member 150 reaches the third intermediate position 248 the primary force exerted on the cam member is about 4,620 pounds and the corresponding secondary force on the output member 106 at the position 258 is about 14,690 pounds. When the cam member 150 reaches the second position 242 the primary force exerted on the cam member is about 4,620 pounds and the corresponding secondary force on the output member 106 at the position 260 is about 24,100 pounds.

The forces set forth above are by way of example only. It will be apparent to those skilled in the art that the angle of the camming surfaces 156 and 158 and the lengths of the primary and secondary links 168, 172, 188, and 198 may be adjusted to effect other desired forces, and may be adjusted to effect other desired displacements of the output member 106 with respect to the cam member. While the present invention is described in relation to a linear power module that utilizes a compressible power unit, it will be understood that other types of linear power modules may be advantageously utilized in the practice of the present invention.

An important advantage of the present invention is that a mechanical advantage is provided so that even though the power ram delivers a greater force in the beginning of its stroke and a diminished force toward the end of the stroke, a diminished force is applied to the tool ram in the beginning of its stroke and a greater force is applied toward the end of the stroke when the increased force is most needed. This results in a relatively lighter and less cumbersome linear power module. Additionally, the present power enhancing unit accommodates a linear input motion and provides a linear output motion so that it can easily interface with existing power modules and industrial tools, both having linear motion rams.

What is claimed is:

1. In a linear power module for actuating a tool ram of an industrial tool, said power module having a power ram arranged to undergo motion along a power axis,
    a power enhancing unit disposed between said power unit and said industrial tool comprising:
    (1) a frame;
    (2) an input member coupled to said power ram arranged to undergo movement in a first direction within said frame from a first position to a second position, wherein said power ram is operable to exert a primary force on said input member to effect said movement in said first direction;
    (3) an output member coupled to said tool ram;
    (4) a power enhancing mechanism coupled to both said input member and said output member, said power enhancing mechanism comprising a plurality of interleaved toggle links, wherein a first toggle link is coupled to the output member at a first pivot point, and a second toggle link is coupled to the output member at a second pivot point distinct from the first pivot point;
    and said power enhancing mechanism arranged so that upon said movement in said first direction of said input member said output member undergoes movement in said first direction and exerts a secondary force on said tool ram that is greater than said primary force for a portion of said movement of said output member,
    wherein said tool ram has a tool axis coaxial with said power axis.

2. The power module according to claim 1 wherein said portion of said movement is relatively near said second position.

3. The power module according to claim 1 wherein said primary force varies during said movement of said input member from a maximum force when said input member is near said first position to a minimum force when said input member is near said second position.

4. The power module according to claim 3 wherein said secondary force varies during said movement of said output member from a minimum force when said input member is near said first position to a maximum force when said input member is near said second position.

5. The power module according to claim 1 wherein said power enhancing mechanism comprises a plurality of first and second pairs of interleaved toggle links each of which includes a primary link pivotally attached to said frame and one of said first and second toggle links pivotally attached to said output member, each said primary link being pivotally attached to one of said first and second toggle links, and wherein said plurality of first and second pairs of toggle links are arranged side by side to form an array of parallel toggle links.

6. The power module according to claim 1 wherein said power enhancing mechanism comprises first and second pairs of interleaved toggle links each of which includes a primary link pivotally attached to said frame and one of said first and second toggle links pivotally attached to said output member, each said primary link being pivotally attached to one of said first and second toggle links.

7. The power module according to claim 6 including a first cam follower attached to said primary link of said first pair of toggle links and a second cam follower attached to said primary link of said second pair of toggle links, and wherein said input member includes a cam having first and second camming surfaces arranged to engage said first and second cam followers, respectively, so that when said cam is moved from said first position to said second position said output member undergoes said movement in said first direction.

8. The power module according to claim 7 wherein said movement in said first direction of said cam and said movement in said first direction of said output member are both movements along said power axis.

9. The power module according to claim 7 wherein each of said first and second camming surfaces has a leading end and a trailing end arranged so that said leading ends are mutually closer together than are said trailing ends.

10. The power module according to claim 9 wherein said first and second camming surfaces are substantially flat and mutually angled.

11. The power module according to claim 9 wherein each of said first and second camming surfaces is arcuate.

* * * * *